(12) United States Patent
Abe

(10) Patent No.: US 8,086,399 B2
(45) Date of Patent: Dec. 27, 2011

(54) NAVIGATION APPARATUS

(75) Inventor: Yuichi Abe, Tottori (JP)

(73) Assignees: Sanyo Electric Co., Ltd., Osaka (JP);
Tottori Sanyo Electric Co., Ltd., Tottori (JP)

(*) Notice: Subject to any disclaimer, the term of this patent is extended or adjusted under 35 U.S.C. 154(b) by 434 days.

(21) Appl. No.: 12/198,508

(22) Filed: Aug. 26, 2008

(65) Prior Publication Data

US 2008/0319651 A1 Dec. 25, 2008

Related U.S. Application Data

(62) Division of application No. 10/493,218, filed on May 5, 2004.

(30) Foreign Application Priority Data

Nov. 30, 2001 (JP) ................................. 2001-366901

(51) Int. Cl.
*G01C 21/00* (2006.01)
(52) U.S. Cl. .......... 701/207; 701/200; 381/56; 381/119; 381/124; 340/988; 342/75; 342/357.52
(58) Field of Classification Search .................... 701/207
See application file for complete search history.

(56) References Cited

U.S. PATENT DOCUMENTS

| | | | | |
|---|---|---|---|---|
| 5,546,092 A | * | 8/1996 | Kurokawa et al. | ....... 342/357.06 |
| 2001/0027375 A1 | | 10/2001 | Machida et al. | |

FOREIGN PATENT DOCUMENTS

| | | |
|---|---|---|
| DE | 195 33 541 C1 | 3/1997 |
| EP | 0 836 074 A2 | 4/1998 |
| EP | 0 836 074 A3 | 7/1999 |
| EP | 0 973 011 A2 | 1/2000 |
| EP | 0 973 011 A3 | 4/2001 |
| EP | 1 096 228 A1 | 5/2001 |
| EP | 1 130 358 A | 9/2001 |
| GB | 2 278 196 A | 11/1994 |
| JP | 9-243391 | 9/1997 |
| JP | 9-330089 A | 12/1997 |
| JP | 10-66149 | 3/1998 |
| JP | 11-337359 | 12/1999 |
| JP | 2000-18960 | 1/2000 |
| JP | 2000-171264 | 6/2000 |
| JP | 2001-108457 A | 4/2001 |
| JP | 2001-148094 | 5/2001 |
| KR | 2001-0071509 A | 7/2001 |

* cited by examiner

*Primary Examiner* — Hussein Elchanti
*Assistant Examiner* — Redhwan K Mawari
(74) *Attorney, Agent, or Firm* — Arent Fox LLP

(57) ABSTRACT

A navigation apparatus includes notification means for notifying an advance direction at a branching point in a route guiding, storage means for storing a plurality of moving methods and notification methods corresponding to the respective moving methods, input means for selecting one of the plurality of moving methods stored in the storage means, and control means for causing the notification means to perform notification by the notification method corresponding to the moving method selected by the input means. Thus, it is possible to easily set a route guiding such as a distance to the branching point where guiding is started for each of the moving methods and a sound volume.

1 Claim, 3 Drawing Sheets

FIG.2

| MODE OF TRAVELING | GUIDANCE-STARTING DISTANCE TO BRANCH | VOLUME LEVEL (MAX. 10) | MAP MATCHING | VEHICLE TYPE TRANSMITTED TO VICS |
|---|---|---|---|---|
| SPECIAL CAR | 2Km | 5 | YES | SPECIAL CAR |
| LARGE CAR | 1.5Km | 6 | YES | LARGE CAR |
| MEDIUM CAR | 2Km | 5 | YES | MEDIUM CAR |
| SMALL CAR | 1.5Km | 5 | YES | SMALL CAR |
| MOTOR BICYCLE | 1.5Km | 8 | YES | MOTOR BICYCLE |
| BICYCLE | NO GUIDANCE | 3 | NO | NOT TRANSMITTED |
| ON FOOT | NO GUIDANCE | 2 | NO | NOT TRANSMITTED |

…

NAVIGATION APPARATUS

CROSS-REFERENCE TO RELATED APPLICATIONS

This application is a divisional application of Ser. No. 10/493,218, filed May 5, 2004 which is a National Phase application of PCT/JP02/12285, filed Nov. 25, 2002, which is based upon and claims the benefit of priority from the prior Japanese Patent Application No. JP 2001-366901, filed on Nov. 30, 2001. The disclosures of the prior applications is hereby incorporated herein in its entirety by reference.

TECHNICAL FIELD

The present invention relates to a navigation apparatus that guides along a travel route.

BACKGROUND ART

Some navigation apparatuses use map matching (see Japanese Patent Application Laid-Open No. H7-63570) whereby the current location is identified by finding the detected current position in a map showing the roads located within the travelable range for the purpose of calculating and displaying a planned travel route from the current location to the destination and, when the distance from the current location to the next branch point becomes equal to a predetermine distance, notifying the user of the distance thereto and the direction in which to travel with voice.

Nowadays, commercially available are not only navigation apparatuses dedicated to car-mounted use but also portable navigation apparatuses that can also be used by walkers. These navigation apparatuses, when mounted on a car, can perform map matching to guide along a travel route. However, when they are used by a walker, since the traveling speed is low relative to the precision of the GPS, it is difficult to calculate the traveling direction, and this makes it impossible to perform map matching correctly. To overcome this inconvenience, i.e., to permit map matching only when a navigation apparatus is mounted on a car and not when used by a walker, the applicant of the present invention once disclosed, in Japanese Patent Application Laid-Open No. 2000-18960, a navigation apparatus wherein whether an external power source or an internal power source is used is detected so that, when an external power source is used, map matching is permitted and, when an internal power source is used, map matching is not permitted.

However, according to the method disclosed in Japanese Patent Application Laid-Open No. 2000-18960 mentioned above, in a case where the navigation apparatus needs to be frequently mounted on and dismounted from a car, as in a case where parcels are delivered to addressees in a town, in which case the deliveryman needs, repeatedly for each destination, to travel by car to a nearby parking lot and then walk on foot therefrom to the destination, the navigation apparatus needs to be connected to and disconnected from an external power source every time it is mounted on and dismounted from the car.

Moreover, in a case where the mode of traveling is changed, as from traveling by car to traveling on foot, or from traveling by four-wheeled car to traveling by motor bicycle, it is necessary to change the settings of the sound volume level, the distance to the next branch point at which to give a guidance, and the like one by one to best suit the given mode of traveling every time the mode of traveling is changed. This makes using the navigation apparatus troublesome.

DISCLOSURE OF THE INVENTION

To overcome the aforementioned shortcomings, according to one aspect of the present invention, a navigation apparatus is provided with: notifying means for notifying, by one of a plurality of notifying methods, of the direction in which to travel at a branch point as guidance along a travel route; storing means for storing, as corresponding respectively to the plurality of notifying methods, a plurality of modes of traveling in which the navigation apparatus can travel; inputting means for selecting one from the plurality of modes of traveling stored by the storing means; and controlling means for controlling the notifying means to notify by the notifying method corresponding to the selected mode of traveling.

Here, preferably, the inputting means selects from, as the plurality of modes of traveling, at least two of the following modes of traveling: traveling by car, by motor bicycle, by bicycle, and on foot.

Moreover, preferably, the plurality of notifying methods differ from one another in the distance to the branch point at which notification is started.

According to another aspect of the present invention, a navigation apparatus is provided with: outputting means for outputting music and sounds; storing means for storing a plurality of modes of traveling and a plurality of sound volume levels corresponding respectively thereto; inputting means for selecting one from the plurality of modes of traveling stored by the storing means; and sound volume controlling means for controlling the outputting means to operate with the sound volume level corresponding to the mode of traveling selected by the inputting means.

Here, preferably, there is additionally provided transmitting means for transmitting the mode of traveling selected by the inputting means to a VICS for the purpose of registering the vehicle type.

According to another aspect of the present invention, a navigation apparatus is provided with: map information storing means for storing map information; and controlling means for performing map matching to find the current position in the roads stored by the map information storing means.

Here, the controlling means performs map matching when the mode of traveling selected by inputting means for selecting from a plurality of modes of traveling is traveling by car or by motor bicycle, and does not perform map matching when the mode of traveling selected by the inputting means is traveling by bicycle or on foot.

BRIEF DESCRIPTION OF DRAWINGS

FIG. 2 is a diagram showing the settings for different modes of traveling in the embodiment of the invention.

BEST MODE FOR CARRYING OUT THE INVENTION

Figure 1:
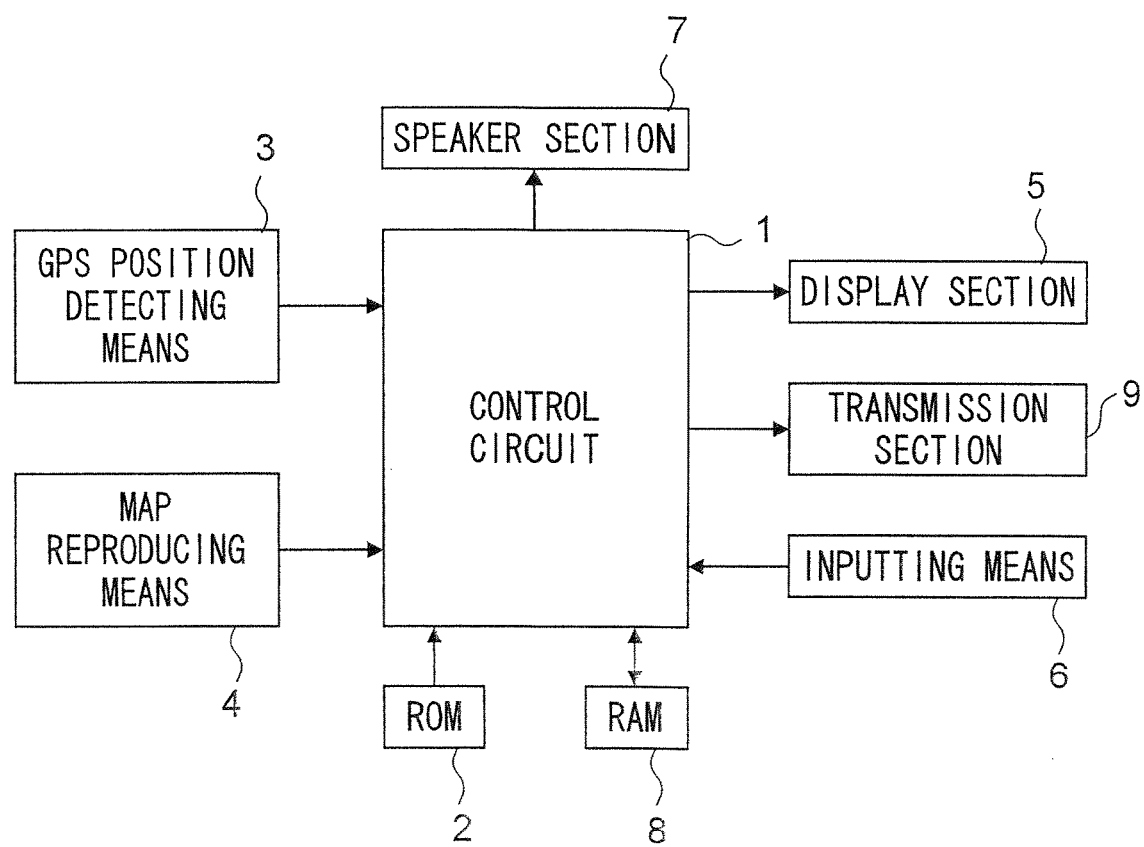
FIG. 1 is a block diagram showing the configuration of a principal portion of an embodiment of the invention.

Hereinafter, an embodiment of the present invention will be described with reference to the drawings. FIG. 1 is block diagram showing the configuration of a principal portion of an embodiment of the invention. Reference numeral (1) represents a control circuit, which operates according to a program stored in a ROM (2) to control the apparatus as a whole.

Reference numeral (3) represents GPS (Global Positioning System) position detecting means, which receives radio waves from GPS satellites to detect the current position and then outputs the detected data to the control circuit (1). Reference numeral (4) represents map reproducing means, which reads out map information from a CD-ROM having map information written thereto and then outputs it to the control circuit (1). Reference numeral (5) represents a display section employing a liquid crystal display. Reference numeral (6) represents inputting means, which the user uses to enter a mode of traveling. The mode of traveling entered here can be selected from traveling by special vehicle, by large-sized car, by medium-sized car, by small-sized car, by motor bicycle, by bicycle, and on foot. Reference numeral (7) represents a speaker section for reproducing sounds. The control circuit (1) controls the speaker section (7) to give the user a piece of guidance, with voice, as to the direction in which to travel at a branch point.

Reference numeral (8) represents a RAM, in which is stored the data needed for the operation of the control circuit (1). This data includes, for example, the settings for different modes of traveling with respect to the distance to the branch point at which to start giving guidance, the sound volume level, whether or not to perform map matching, etc., and also the locations of the starting, destination, and midway points on the basis of which to plan a travel route.

Reference numeral (9) represents a transmission section, which transmits the mode of traveling selected by the inputting means (6) to the provider of the VICS (Vehicle Information and Communication System) service. The VICS service is a service provided by the incorporated foundation for the Vehicle Information and Communication System. In this system, once the type of vehicle fitted with the apparatus is reported to the VICS system and is registered therein, the service provider can grasp where the thus registered vehicle is traveling and thus can provide it with detailed information on road and traffic condition.

Next, the basic operation of the present invention will be described. When a mode of traveling in which the apparatus travels is selected by the inputting means (6), the control circuit (1) selects and stores, from the settings for different modes of traveling as shown in FIG. 2 that are stored in the RAM (8) to be used to guide along a travel route, those which correspond to the selected mode of traveling. Based on the selected settings, the control circuit (1) transmits the mode of traveling from the transmission section (9) to the VICS, and simultaneously gives guidance of the travel route from the starting location to the destination location.

For example, in a case where traveling by medium-sized car is selected as the mode of traveling, when the mode of traveling needs to be transmitted, it is reported as traveling by medium-sized car, and guidance is started with a sound volume level "5" when the distance to a branch point by way of which the travel route is guided becomes 2 km. Moreover, map matching is performed so that the current location is displayed while guidance is given along the travel route from the starting location to the destination location. By contrast, in a case where traveling on foot is selected, the current and destination locations are displayed, but neither transmission of the mode of traveling nor map matching is performed.

Figure 3:
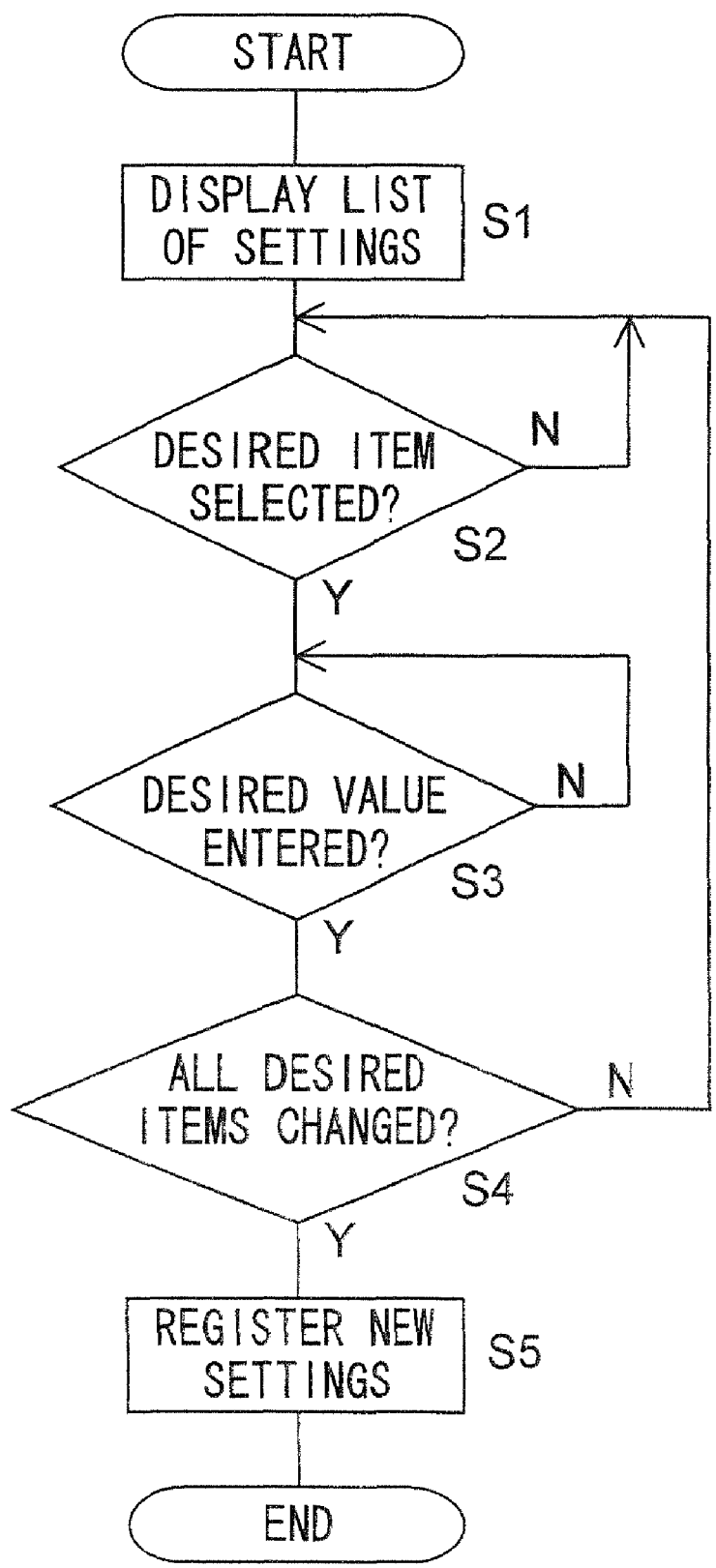
FIG. 3 is a flow chart showing the operation performed when the settings for different modes of traveling are changed in the embodiment of the invention.

Here, the settings for different modes of traveling are stored beforehand in the RAM (8) as shown in FIG. 2. It is, however, also possible to permit the user to freely change and register those settings by the procedure described below and shown in FIG. 3. In FIG. 3, first, in step S1, the list of the settings shown in FIG. 2 is displayed on the display section (5). The user selects from the displayed list the item that he or she wants to change (step S2), and then enters the desired value (step S3). When the user has changed all the items that he or she wants to change ("Y" in step S4), the new settings are registered in the RAM (8) (step S5).

The present invention is applicable not only to navigation systems that use voice for notification, but also to those which only visually notify of the distance to a branch point and the direction in which to travel.

The adjustment of the sound volume level in the present invention is applicable not only to the guidance of a travel route, but also, where a navigation apparatus incorporates an audio or video system such as a CD player or television monitor, to the sounds thereof.

The present invention is applicable not only to portable navigation systems that can also be used by walkers, but also to car-mounted ones that can be transported from one car to another.

INDUSTRIAL APPLICABILITY

As described above, by registering beforehand the settings to be used to guide along a travel route, i.e., the settings of the distance to a branch point at which to start guidance, the sound volume level, whether or not to perform map matching, etc., for different modes of travel of the apparatus, it is no longer necessary to make those settings individually at the start of use.

Moreover, since the setting of whether or not to perform map matching is registered beforehand for each of different modes of travel of the apparatus, even in a case where the apparatus is frequency mounted on and dismounted from a car, it is not necessary to connect and disconnect an external power source every time the apparatus is mounted on and dismounted from the car.

Furthermore, by transmitting the entered mode of traveling to the provider of the VICS service and thereby registering the vehicle type, the user can make settings for the guidance of a travel route and simultaneously register the vehicle type.

The invention claimed is:
1. A navigation apparatus comprising:
an outputting device configured to output music and sounds;
a storing device configured to store a plurality of modes of traveling and a plurality of sound volume levels, wherein the respective sound volume levels of the plurality of sound volume levels corresponds to the respective modes of the plurality of modes of traveling;
an inputting device configured to select one from the plurality of modes of traveling stored by the storing device; and
a sound volume controlling circuit configured to control the outputting device to output the sound volume level corresponding to the mode of traveling selected by the inputting device; wherein the inputting device selects from, as the plurality of modes of traveling, at least two of the following modes of traveling: traveling by car, by motor bicycle, by bicycle, and on foot.

* * * * *